United States Patent
Kim et al.

(10) Patent No.: US 12,305,017 B2
(45) Date of Patent: May 20, 2025

(54) GRAPHITE SHEET AND ELECTRONIC DEVICE COMPRISING SAME

(71) Applicant: PI Advanced Materials Co., Ltd., Chungcheongbuk-do (KR)

(72) Inventors: Kyung Su Kim, Chungcheongbuk-do (KR); Dong Young Won, Chungcheongbuk-do (KR); Jeong Yeul Choi, Chungcheongbuk-do (KR)

(73) Assignee: PI ADVANCED MATERIALS CO., LTD., Chungcheongbuk-do (KR)

( * ) Notice: Subject to any disclaimer, the term of this patent is extended or adjusted under 35 U.S.C. 154(b) by 676 days.

(21) Appl. No.: 17/628,949

(22) PCT Filed: Oct. 29, 2019

(86) PCT No.: PCT/KR2019/014396
§ 371 (c)(1),
(2) Date: Jan. 21, 2022

(87) PCT Pub. No.: WO2021/015363
PCT Pub. Date: Jan. 28, 2021

(65) Prior Publication Data
US 2022/0259400 A1    Aug. 18, 2022

(30) Foreign Application Priority Data

Jul. 22, 2019  (KR) ......................... 10-2019-0088084

(51) Int. Cl.
*C08K 3/04*     (2006.01)
*C08J 3/24*     (2006.01)
*C08J 5/18*     (2006.01)

(52) U.S. Cl.
CPC ................ *C08K 3/042* (2017.05); *C08J 3/24* (2013.01); *C08J 5/18* (2013.01); *C08J 2379/08* (2013.01); *C08K 2201/001* (2013.01)

(58) Field of Classification Search
CPC ......... C08J 5/18; C08J 2379/08; C08K 3/042; C08K 9/04; C08K 2003/265; C08K 2003/3045; C08K 2003/325; C08K 3/013; C08K 9/10; C08K 2201/005; C08L 79/08; C01B 32/205; C01B 32/182; C01B 32/184; C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/21; C01B 32/215; C01B 32/22; C01B 32/225; C01B 32/23; C04B 35/52; C04B 35/622; C04B 35/522; C04B 35/62218; C08G 73/1021
See application file for complete search history.

(56) References Cited

U.S. PATENT DOCUMENTS

2006/0035085 A1* 2/2006 Ozaki ............... C04B 35/63468
                                                   428/408
2019/0144286 A1* 5/2019 Won ..................... C01B 32/205
                                                   423/449.6

FOREIGN PATENT DOCUMENTS

| JP | 2002-363421 A | 12/2002 |
| JP | 6982694 B2 | 12/2021 |
| JP | 7015934 B2 | 2/2022 |
| KR | 10-2012-0140447 A | 12/2012 |
| KR | 10-2017-0049912 A | 5/2017 |
| KR | 10-1951306 B1 | 2/2019 |
| WO | WO-2005/019132 A1 | 3/2005 |

OTHER PUBLICATIONS

International Search Report from PCT Application No. PCT/KR2019/014396 dated Apr. 21, 2020.

* cited by examiner

*Primary Examiner* — Daniel C. McCracken
(74) *Attorney, Agent, or Firm* — Harness, Dickey & Pierce, P.L.C.

(57) ABSTRACT

Disclosed are a graphite sheet having a thermal conductivity with respect to the planar direction of about 1,000 W/m·K or more and a thermal conductivity with respect to the thickness direction of about 30 W/m·K or more, and an electronic device including the same.

11 Claims, No Drawings

GRAPHITE SHEET AND ELECTRONIC DEVICE COMPRISING SAME

CROSS-REFERENCE TO RELATED APPLICATIONS

This application is a national phase application of PCT Application No. PCT/KR2019/014396, filed on Oct. 29, 2019, which claims benefit of Korean Patent Application No. 10-2019-0088084, filed on Jul. 22, 2019. The entire disclosure of the applications identified in this paragraph are incorporated herein by references.

TECHNICAL FIELD

The present disclosure relates to a graphite sheet and an electronic device including the same. More specifically, the present disclosure relates to a graphite sheet having a thermal conductivity with respect to the planar direction of about 1,000 W/m·K or more and a thermal conductivity with respect to the thickness direction of about 30 W/m·K or more, and an electronic device including the same.

BACKGROUND ART

Recently, structures of electronic devices are gradually becoming lighter, smaller, thinner, and highly integrated so that many problems due to heat load occur as the amount of heat generated per unit volume increases. For example, typical problems may include those that directly affect the performance of electronic devices, such as a decrease in the operation speed of semiconductors due to the thermal load of the electronic devices, lifespan shortening due to deterioration of the battery, etc. For this reason, effective heat dissipation of the electronic devices is emerging as one of very important tasks.

Graphite with excellent thermal conductivity is attracting attention as a heat dissipation means used in electronic devices, and among them, an artificial graphite sheet which is easily processed into a sheet form and has a thermal conductivity that is about 2 to 7 times superior to that of copper or aluminum is in the spotlight.

An artificial graphite sheet can be manufactured through the carbonization process and graphitization process of polymers, and a heat-resistant polymer capable of withstanding a temperature of about 400° C. or higher among the polymers may be used as a graphite precursor. A representative example of such a heat-resistant polymer may include polyimide (PI).

As a polymer material which is based on an imide ring with excellent chemical stability along with a rigid aromatic main chain and has the highest level of heat resistance, chemical resistance, electrical insulation properties, and weather resistance among organic materials, polyimide is known as an optimal graphite precursor by enabling excellent yield, crystallinity and thermal conductivity when manufacturing the artificial graphite sheet.

In general, physical properties of the artificial graphite sheet are known to be greatly affected by those of polyimide that is a precursor, and the improvement of polyimide is being actively carried out in order to improve the physical properties of the artificial graphite sheet. In particular, many studies are being conducted to improve the thermal conductivity of the artificial graphite sheet.

A typical example may include manufacturing polyimide into a film of high orientation, and using the film of high orientation in the manufacture of a graphite sheet. The highly oriented polyimide film may be one which is obtained by drying a polyamic acid that is a precursor and orienting polymer chains in the planar direction of the film through a process such as stretching, compression, or the like. Uniformly oriented polymer chains may form a graphite layer with excellent crystallinity while forming a regular carbon arrangement during carbonization and graphitization. Accordingly, a graphite sheet of a multilayered graphite structure with excellent crystallinity may be manufactured using the highly oriented polyimide film.

However, such a graphite sheet has a very excellent thermal conductivity in the two-dimensional planar direction, but has about 1% or less of a thermal conductivity in the thickness direction compared to the planar direction. This is presumed to be due to the existence of a physical gap between the layers as most of the graphite layers are overlapped by electrical attraction.

Accordingly, there is a need for the development of a graphite sheet having excellent thermal conductivity in the thickness direction as well as in the planar direction and polyimide enabling the implementation thereof.

SUMMARY

Technical Problem

An object of the present disclosure is to provide a graphite sheet which has excellent thermal conductivity in both the planar direction and the thickness direction.

Another object of the present disclosure is to provide an electronic device including the graphite sheet.

Technical Solution

1. According to an aspect, there is provided a graphite sheet having a thermal conductivity with respect to the planar direction of about 1,000 W/m·K or more and a thermal conductivity with respect to the thickness direction of about 30 W/m·K or more.

2. In 1 above, the graphite sheet may have the number of bright spots of about 5 or less.

3. In 1 or 2 above, the graphite sheet may have a thickness of about 10 to 100 μm.

4. In any one of 1 to 3 above, the graphite sheet may be manufactured from a polyimide film, and the polyimide film may have about 4 surface defects or less.

5. In any one 1 to 4 above, the graphite sheet may be manufactured from a polyimide film, and the polyimide film may comprise a polyimide-based filler.

6. In 5 above, the polyimide-based filler may include a polyimide-based filler containing graphene.

7. In 5 or 6 above, the polyimide film may have a structure in which at least a portion of the polyimide-based filler is dispersed between multilayer structures in which at least some of polyimide chains are oriented in the planar direction.

8. In 7 above, the graphite sheet manufactured from the polyimide film may have a structure in which a crosslinking portion is connected between layers of a multilayer graphite structure, the multilayer graphite structure may be formed by graphitizing at least a portion of the multilayer structures of the polyimide chains, and the crosslinking portion may be formed by graphitizing at least a portion of the polyimide-based filler.

9. In any one of 5 to 8 above, the polyimide-based filler may include a spherical polyimide-based filler with an average particle diameter of about 1 to 10 μm.

10. In any one of 5 to 9 above, the polyimide film may be manufactured from a polyamic acid, and the polyimide-based filler may be contained in an amount of about 0.1 to 5 parts by weight with respect to 100 parts by weight of the polyamic acid.

11. In any one of 5 to 10 above, the polyimide film may further comprise an inorganic filler having sublimability.

12. According to another aspect, there is provided an electronic device including the graphite sheet of any one of 1 to 11 above.

Advantageous Effects

The present disclosure has the effect of providing a graphite sheet having excellent thermal conductivity in both the planar direction and the thickness direction, and an electronic device including the same.

DETAILED DESCRIPTION

If it is determined that a detailed description of the related known technology unnecessarily obscures the gist of the present disclosure in describing the present disclosure, the detailed description thereof is omitted.

When the terms 'comprising', 'having', 'consisting', etc. mentioned in the present specification are used, other parts may be added unless 'only' is used. The case of expressing constituent elements in a singular form includes cases of involving plural forms unless there is a specifically explicit description.

Further, in interpreting the constituent elements, it is interpreted that an error range is included even if there is no separate explicit description.

Terms such as first, second, etc. used in the present specification may be used to describe various components, but the components should not be limited by the terms. Terms are used for the purpose only to distinguish one component from another.

In the present specification, "to" in "a to b" representing the numerical range is defined as ≥a and ≤b.

According to an aspect, there is provided a graphite sheet. The graphite sheet may have a thermal conductivity with respect to the planar direction of about 1,000 W/m·K or more (for example, about 1,000, about 1,005, about 1,010, about 1,015, about 1,020, about 1,025, about 1,030, about 1,035, about 1,040, about 1,045, about 1,050, about 1,055, about 1,060, about 1,065, about 1,070, about 1,075, about 1,080, about 1,085, about 1,090, about 1,095, about 1,100, about 1,105, about 1,110, about 1,115, about 1,120, about 1,125, about 1,130, about 1,135, about 1,140, about 1,145, about 1,150, about 1,155, about 1,160, about 1,165, about 1,170, about 1,175, about 1,180, about 1,185, about 1,190 or about 1,095 W/m·K or more), and a thermal conductivity with respect to the thickness direction of about 30 W/m·K or more (for example, about 30, about 31, about 32, about 33, about 34, about 35, about 36, about 37, about 38, about 39, about 40, about 41, about 42, about 43, about 44, about 45, about 46, about 47, about 48, about 49, about 50, about 51, about 52, about 53, about 54, about 55, about 56, about 57, about 58, about 59, about 60, about 61, about 62, about 63, about 64, about 65, about 66, about 67, about 68, about 69, about 70 or about 71 W/m·K or more). For example, the graphite sheet may have a thermal conductivity with respect to the planar direction of about 1,000 to 1,700 W/m·K (e.g., about 1,000, about 1,100, about 1,200, about 1,300, about 1,400, about 1,500, about 1,600, or about 1,700 W/m·K), and a thermal conductivity with respect to the thickness direction of about 30 to 100 W/m·K (e.g., about 30, about 40, about 50, about 60, about 70, about 80, about 90, or about 100 W/m·K). For another example, the graphite sheet may have a thermal conductivity with respect to the planar direction of about 1,000 W/m·K or more, and a thermal conductivity with respect to the thickness direction of about 60 W/m·K or more, but the present disclosure is not limited thereto.

According to an embodiment, the graphite sheet, although the present disclosure is not limited thereto, may have about 5 bright spots or less (e.g., 0, about 1, about 2, about 3, about 4, or about 5 bright spots). Here, the number of bright spots may mean the number of protrusions occurred having a size of 0.05 mm or more, that is, a diameter of 0.05 mm or more, per unit area (50 mm*50 mm) of the graphite sheet, and it may be measured by using a microscope or by taking a picture and then magnifying the surface of the graphite sheet and observing it with the naked eye.

According to an embodiment, although the present disclosure is not limited thereto, the graphite sheet may have a thickness of about 10 to 100 μm (e.g., about 10, about 20, about 30, about 40, about 50, about 60, about 70, about 80, about 90, or about 100 μm).

According to an embodiment, the graphite sheet may be manufactured from a polyimide film. For example, the graphite sheet may be manufactured by carbonizing and/or graphitizing the polyimide film.

Carbonization may be performed using a hot press and/or an electric furnace, for example, under reduced pressure or under an inert gas atmosphere. For example, carbonization may comprise the step of raising and maintaining the temperature from room temperature to a temperature range of about 1,000 to 1,500° C. that is the highest temperature under the nitrogen/argon atmosphere over about 12 hours, and a pressure may also be applied in the vertical direction using a hot press for the purpose of high orientation properties of carbon. During the carbonization, a pressure of about 5 kg/cm$^2$ or more, for example about 15 kg/cm$^2$ or more, and for another example about 25 kg/cm$^2$ or more may be applied, but the present disclosure is not limited thereto.

Graphitization may be carried out using, for example, a hot press and/or an electric furnace, optionally under the atmosphere of inert gases (e.g., a mixed gas containing nitrogen, argon, and a small amount of helium). For example, graphitization may comprise the step of raising and maintaining the temperature from room temperature to a temperature range of about 2,500 to 3,000° C. that is the highest temperature under the nitrogen/argon atmosphere over about 10 hours, and optionally a pressure of about 100 kg/cm$^2$ or more, for example about 200 kg/cm$^2$ or more, and for another example about 300 kg/cm$^2$ or more may be applied, but the present disclosure is not limited thereto.

According to an embodiment, the polyimide film used for manufacturing the graphite sheet may have about 4 surface defects or less (e.g., 0, about 1, about 2, about 3, or about 4 surface defects) such as protrusions or pinholes per unit area (10 mm*10 mm) of the polyimide film. Here, the number of surface defects may be measured by using a microscope or taking a picture and then magnifying the surface of the polyimide film to observe it with the naked eye.

According to an embodiment, the polyimide film used in manufacturing the graphite sheet may comprise a polyimide-based filler. In this case, there may be an effect of improving thermal conductivity in the thickness direction of the graphite sheet by allowing a carbonized and/or graphitized polyimide-based filler to connect between the graphite layers formed from the polyimide film when performing carbonization and/or graphitization. For example, the polyimide film may have a structure in which at least a portion of the polyimide-based filler is dispersed between multilayer structures in which at least some of polyimide chains are oriented in the planar direction. The graphite sheet manufactured from such a polyimide film may have a structure in which a crosslinking portion formed by graphitizing at least a portion of the polyimide-based filler connects between layers of a multilayer graphite structure formed by graphitizing at least a portion of the multilayer structures of the polyimide chains. The crosslinking portion may be a graphite form having a two-dimensional planar shape, a carbon allotrope close to the graphite form, or a three-dimensional carbon allotrope in which the two-dimensional carbon allotropes are stacked, and may act as a heat transfer path between the layers.

According to an embodiment, the polyimide-based filler may include a polyimide-based filler containing graphene. The polyimide-based filler containing graphene may be a first composite form in which one or more graphene are dispersed inside a polyimide resin, a second composite form in which one or more graphene are attached to the outer surface of the polyimide resin, or a third composite form in which the first composite and the second composite are composited, but the present disclosure is not limited thereto.

When graphene is included alone as a filler, it is difficult for graphene to be uniformly dispersed in a polyamic acid, there is a high possibility that graphene is dropped during the drying process of the polyamic acid, and there is a problem in that defects such as wrinkles, swells, pinholes, cracks, or others are caused in the process of stretching a gel film or a polyimide film due to a difference in thermal and mechanical properties between polyimide and graphene. However, since, when using the polyimide-based filler containing graphene, a polyimide resin with physical properties the same as or similar to those of the polyimide film forms a composite along with graphene, the above-described problems may be solved.

When the polyimide-based filler containing graphene is included as the polyimide-based filler, an additional crosslinking portion derived from graphene may be further included in addition to the crosslinking portion formed by graphitizing at least a portion of the polyimide-based filler when performing carbonization and/or graphitization. In this case, thermal conductivity in the thickness direction of the graphite sheet may be improved. A portion of graphene, which does not form the additional crosslinking portion, may be interposed substantially parallel to the layers between the layers of the multilayer graphite structure. In this case, thermal conductivity in the planar direction of the graphite sheet may be improved.

Although the shape of graphene is not particularly limited, for example, it may be a plate-like structure, and have an average long diameter of about 5 to 15 µm (e.g., about 5, about 6, about 7, about 8, about 9, about 10, about 11, about 12, about 13, about 14 or about 15 µm) and an average length with respect to the vertical direction of about 1 to 10 nm (e.g., about 1, about 2, about 3, about 4, about 5, about 6, about 7, about 8, about 9 or about 10 nm).

The content of graphene is not particularly limited, but for example, graphene may be contained in an amount of about 1 to 5 parts by weight (e.g., about 1, about 2, about 3, about 4 or about 5 parts by weight) with respect to 100 parts by weight of the polyamic acid for polyimide resin production (hereinafter also referred to as 'a first polyamic acid'). In the above range, the graphite sheet may have excellent thermal conductivity both in the planar direction and thickness direction.

According to an embodiment, the polyimide-based filler, although the present disclosure is not limited thereto, may include a polyimide-based filler which is spherical and has an average particle diameter of about 1 to 10 µm (e.g., about 1, about 2, about 3, about 4, about 5, about 6, about 7, about 8, about 9 or about 10 µm). In this case, the dispersibility of the polyimide-based filler is excellent, the polyimide-based filler is not exposed on the surface of the polyimide film to reduce the surface defects, and when performing carbonization and/or graphitization, the polyimide-based filler does not interfere with rearrangement of carbon atoms and does not damage the graphite sheet, thereby obtaining an effect of excellent thermal conductivity both in planar direction and thickness direction of the graphite sheet.

According to an embodiment, the polyimide-based filler may be prepared from a polyamic acid. The polyamic acid for preparing the polyimide-based filler (hereinafter also referred to as 'a first polyamic acid') may be the same as or different from a polyamic acid for manufacturing the polyimide film (hereinafter also referred to as 'a second polyamic acid').

According to an embodiment, although the amount of the polyimide-based filler used is not limited thereto, the polyimide-based filler may be contained in an amount of about 0.1 to 5 parts by weight (e.g., about 0.1, about 0.2, about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9, about 2, about 2.1, About 2.2, about 2.3, about 2.4, about 2.5, about 2.6, about 2.7, about 2.8, about 2.9, about 3, about 3.1, about 3.2, about 3.3, about 3.4, about 3.5, about 3.6, about 3.7, about 3.8, about 3.9, about 4, about 4.1, about 4.2, about 4.3, about 4.4, about 4.5, about 4.6, about 4.7, about 4.8, about 4.9 or about 5 parts by weight) with respect to 100 parts by weight of the polyamic acid. In this case, the dispersibility of the polyimide-based filler in the polyamic acid is excellent, the polyimide-based filler is not exposed on the surface of the polyimide film to reduce the surface defects, and when performing carbonization and/or graphitization, the polyimide-based filler does not interfere with rearrangement of carbon atoms and does not damage the graphite sheet, thereby obtaining an effect of excellent thermal conductivity both in planar direction and thickness direction of the graphite sheet.

The polyimide-based filler may be prepared by various methods, and a method for preparing the polyimide-based filler is not particularly limited. For example, the method for preparing the polyimide-based filler may comprise the steps of: preparing a first polyamic acid solution by mixing and polymerizing a solvent, a diamine monomer, and a dianhydride monomer; aging the first polyamic acid solution at a temperature of about 60 to 100° C. for about 2 to 6 hours; removing the solvent used in the polymerization while solidifying the aged first polyamic acid solution by discharging it to an excessive amount of a solvent; and pulverizing the solidified discharge to obtain a powder granular polyimide-based filler. A method for preparing the polyimide-based filler containing graphene may comprise, for example, the steps of: preparing a first polyamic acid solution by mixing and polymerizing a solvent, a diamine monomer, and a dianhydride monomer; injecting graphene into the first polyamic acid solution and performing stirring; aging the graphene-containing first polyamic acid solution at a temperature of about 60 to 100° C. for about 2 to 6 hours;

removing the solvent used in the polymerization while solidifying the aged first polyamic acid solution by discharging it to an excessive amount of a solvent; and pulverizing the solidified discharge to obtain a powder granular polyimide-based filler. The graphene injection step may comprise, for example, the step of injecting the total amount of graphene into the first polyamic acid solution and performing stirring, or injecting the total amount of graphene during viscosity control of the first polyamic acid, and performing stirring. Here, the viscosity control of the first polyamic acid may mean a process of controlling the viscosity while split-injecting any one monomer having a relatively small molar amount of the diamine monomer and the dianhydride monomer in small portions until the first polyamic acid reaches a desired viscosity, and in this process, the diamine monomer and the dianhydride monomer may be substantially equimolar. The types of solvents, diamine monomers and dianhydride monomers that can be used when preparing the polyimide-based filler may be understood with reference to the types of solvents, diamine monomers and dianhydride monomers that can be used when preparing a second polyamic acid to be described later.

According to an embodiment, the polyimide film may further comprise an inorganic filler having sublimation properties in addition to the polyimide-based filler. When performing carbonization and/or graphitization of the polyimide film, the inorganic filler may sublimate to induce a certain foaming phenomenon. Such a foaming phenomenon may facilitate the exhaust of the sublimation gas generated during carbonization and/or graphitization to make it possible to obtain a good quality graphite sheet, and certain voids formed according to foaming may have the effect of improving the bending resistance (flexibility) of the graphite sheet. However, excessive foaming phenomenon and the resulting large number of voids may greatly deteriorate thermal conductivity and mechanical properties of the graphite sheet and cause the surface defects to damage the value of the graphite sheet as a commodity so that the type, content and particle size of the inorganic fillers should be chosen carefully.

According to an embodiment, the inorganic filler may have an average particle diameter of about 1.5 to 4.5 μm (e.g., about 1.5, about 2, about 2.5, about 3, about 3.5, about 4 or about 4.5 μm). In the above range, the dispersibility of the inorganic filler is excellent, the inorganic filler is not exposed on the surface of the polyimide film to reduce the surface defects, and when performing carbonization and/or graphitization, an appropriate foaming phenomenon is induced so that there may be an effect of obtaining a good quality graphite sheet (e.g., a graphite sheet which has excellent thermal conductivity in the planar direction and thickness direction and has about 5 bright spots or less).

According to an embodiment, the inorganic filler may be used in an amount of about 0.2 to 0.5 parts by weight (e.g., about 0.2, about 0.3, about 0.4 or about 0.5 parts by weight) with respect to 100 parts by weight of the polyamic acid. In the above range, the dispersibility of the inorganic filler is excellent, the inorganic filler is not exposed on the surface of the polyimide film to reduce the surface defects, and when performing carbonization and/or graphitization, an appropriate foaming phenomenon is induced so that there may be an effect of obtaining a good quality graphite sheet (e.g., a graphite sheet which has excellent thermal conductivity in the planar direction and thickness direction and has about 5 bright spots or less).

According to an embodiment, the inorganic filler may include dicalcium phosphate, barium sulfate and/or calcium carbonate, but the present disclosure is not limited thereto.

According to an embodiment, the polyimide film may be manufactured from a precursor composition, for example, a precursor composition comprising a polyamic acid solution, a polyimide-based filler, and optionally an inorganic filler. The polyamic acid solution may be prepared, for example, by dissolving and polymerizing an aromatic diamine monomer and an aromatic dianhydride monomer in a solvent so that they become substantially equimolar.

For example, the polymerization method may include:

(1) a method of putting the total amount of a diamine monomer into a solvent, and then adding a dianhydride monomer so as to be substantially equimolar with the diamine monomer, thereby performing polymerization;

(2) a method of putting the total amount of the dianhydride monomer in the solvent, and then adding the diamine monomer so as to be substantially equimolar with the dianhydride monomer, thereby performing polymerization;

(3) a method of putting some components of the diamine monomer into the solvent, mixing some components of the dianhydride monomer at a ratio of about 95 to 105 mol % with respect to the reaction components, adding the remaining diamine monomer components thereto, and continuously adding the remaining dianhydride monomer components thereto so that the diamine monomer and the dianhydride monomer become substantially equimolar, thereby performing polymerization;

(4) a method of putting the dianhydride monomer into the solvent, mixing some components of the diamine monomer at a ratio of about 95 to 105 mol % with respect to the reaction components, adding the remaining dianhydride monomer components thereto, and continuously adding the remaining diamine monomer components thereto so that the diamine monomer and the dianhydride monomer become substantially equimolar, thereby performing polymerization; or (5) a method of forming a first composition by reacting some diamine monomer components with some dianhydride monomer components in a solvent so that either one is excessive, forming a second composition by reacting some diamine monomer components with some dianhydride monomer components in another solvent so that either one is excessive, mixing the first and second compositions, and completing polymerization, wherein the dianhydride monomer components are contained in an excessive amount in the second composition when the diamine monomer components are excessive in the first composition and the diamine monomer components are contained in an excessive amount in the second composition when the dianhydride monomer components are excessive in the first composition, and the first composition and the second composition are mixed so that the total diamine monomer components and dianhydride monomer components used in these reactions become substantially equimolar, thereby performing polymerization, but the present disclosure is not limited thereto.

A dianhydride monomer that can be used in the preparation of the polyamic acid solution may include pyromellitic dianhydride, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenonetetracarboxylic dianhydride, 2,2-bis(3,4-dicarboxyphenyl)propane dianhydride, 3,4,9,10-perylenetetracarboxylic dianhydride, bis(3,4-dicarboxyphenyl)propane dianhydride, 1,1-bis(2,3- dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic anhydride, bis(3,4-dicarboxyphenyl) sulfone dianhydride, p-phenylene bis(trimellitic acid monoester anhydride), ethylene bis(trimellitic acid monoester anhydride), and bisphenol A bis(trimellitic acid monoester anhydride), and analogues thereof, and these may be used alone or as a mixture mixed at any ratio, but the present disclosure is not limited thereto.

A diamine monomer that can be used in the preparation of the polyamic acid solution may include 4,4'-diaminodiphenylpropane, 4,4'-diaminodiphenylmethane, benzidine, 3,3'-dichlorobenzidine, 4,4'-diaminodiphenyl sulfide, 3,3'-diaminodiphenylsulfone, 4,4'-diaminodiphenylsulfone, 4,4'-diaminodiphenyl ether(4,4'-oxydianiline), 3,3'-diaminodiphenyl ether(3,3'-oxydianiline), 3,4'-diaminodiphenyl ether(3,4'-oxydianiline), 1,5-diaminonaphthalene, 4,4'-diaminodiphenyl diethyl silane, 4,4'-diaminodiphenyl silane, 4,4'-diaminodiphenyl ethylphosphine oxide, 4,4'-diaminodiphenyl N-methylamine, 4,4'-diaminodiphenyl N-phenyl amine, 1,4-diaminobenzene (p-phenylenediamine), 1,3-diaminobenzene, 1,2-diaminobenzene, and analogues thereof, and these may be used alone or as a mixture mixed at any ratio, but the present disclosure is not limited thereto.

The solid content of the polyamic acid solution may be obtained in a concentration of, for example, about 5 to 35% by weight (e.g., about 5, about 6, about 7, about 8, about 9, about 10, about 11, about 12, about 13, About 14, about 15, about 16, about 17, about 18, about 19, about 20, about 21, about 22, about 23, about 24, about 25, about 26, about 27, about 28, about 29, about 30, about 31, about 32, about 33, about 34 or about 35% by weight), and for another example, about 10 to 30% by weight. In the above range, the polyamic acid solution may have suitable molecular weight and solution viscosity for forming a film.

The solvent is not particularly limited as long as it is a solvent in which the polyamic acid can be dissolved, and for example, it may be an aprotic polar solvent. Non-limiting examples of the aprotic polar solvents may include amide-based solvents such as N,N'-dimethylformamide (DMF), N,N'-dimethylacetamide (DMAc), and the like, phenol-based solvents such as p-chlorophenol, o-chlorophenol, and the like, N-methyl-pyrrolidone (NMP), gamma butyrolactone (GBL), Diglyme, etc., and these may be used alone or in combinations of two or more thereof. In some cases, solubility of the polyamic acid may also be adjusted using an auxiliary solvent such as toluene, tetrahydrofuran, acetone, methyl ethyl ketone, methanol, ethanol, water, or the like. In an embodiment, the solvent may be an amide-based solvent, and may be, for example, N,N-dimethylformamide and N,N-dimethylacetamide.

According to an embodiment, the polyimide film may be manufactured by comprising: (a) a step of mixing a solvent, a diamine monomer, and a dianhydride monomer to prepare a polyamic acid solution;

(b) a step of preparing a precursor composition by mixing a polyimide-based filler and optionally an inorganic filler with the polyamic acid solution;

(c) a step of casting the precursor composition on a support and drying the precursor composition cast on the support to manufacture a gel film; and (d) an imidization step of heat-treating the gel film to form a polyimide film. However, all the monomers may be added at once or each of the monomers may be added sequentially in the step (a) depending on the type of monomers and desired physical properties of the polyimide film, and in this case, partial polymerization between the monomers may occur. The method of adding the polyimide-based filler and the inorganic filler is not particularly limited, and any known method may be used.

According to an embodiment, a first catalyst having a linear structure and a second catalyst having a ring structure may be additionally injected into the polyamic acid solution in the step (b). At this time, the second catalyst may have a content of about 10 to 30% by mole (e.g., about 10, about 11, about 12, about 13, about 14, about 15, about 16, about 17, about 18, about 19, about 20, about 21, about 22, about 23, about 24, about 25, about 26, about 27, about 28, about 29 or about 30% by mole) based on the total amount of the first catalyst and the second catalyst. In this case, packing properties of polyamic acid polymer chains may be improved, and appropriate imidization rate may be achieved. Here, the packing properties may be properties meaning that the polyamic acid polymer chains are regularly arranged and overlapped so that the entire molecular structure of the polyamic acid is regular. When manufacturing a polyimide film from a polyamic acid with improved packing properties, the packing efficiency of polyimide film polymer chains may be improved, and accordingly, the entire molecular structure of polyimide may include many crystalline portions while having regularity. Therefore, when manufacturing a graphite sheet using such a polyimide film, as carbon is regularly arranged from the regular molecular structure of polyimide, a graphite sheet with excellent crystallinity may be manufactured, and excellent crystallinity may contribute to the improvement of thermal conductivity of the graphite sheet, particularly thermal conductivity in the planar direction.

According to an embodiment, the total injection amount of the first catalyst and the second catalyst may be in a range of about 1.5 to 4.5 moles (e.g., about 1.5, about 2, about 2.5, about 3, about 3.5, about 4 or about 4.5 moles), and for another example, in a range of about 2.5 to 3.5 moles with respect to 1 mole of an amic acid group in the second polyamic acid. The polyimide film or graphite sheet manufactured in the above range may have excellent thermal and/or mechanical properties.

Examples of the first catalyst may include dimethylacetamide (DMAc), N,N-diethylacetamide, dimethylformamide (DMF), diethylformamide (DEF), etc., and these may be used alone or in mixtures of two or more thereof, but the present disclosure is not limited thereto. According to an embodiment, the first catalyst may be dimethylformamide, and in this case, there may be an effect of improving thermal conductivity.

Examples of the second catalyst may include N-methyl-2-pyrrolidone (NMP), N-ethylpyrrolidone (NEP), N-vinylpyrrolidone, 1,3-dimethyl-2-imidazolidinone, etc., and these may be used alone or in mixtures of two or more thereof, but the present disclosure is not limited thereto. According to an embodiment, the second catalyst may be N-methylpyrrolidone.

A method for manufacturing a polyimide film by imidizing the precursor composition may use, for example, a thermal imidization method, a chemical imidization method, or a composite imidization method in which the thermal and chemical imidization methods are combined.

As a method of proceeding the imidization reaction only by heating without applying dehydration pills, etc., the thermal imidization method is a method of obtaining a polyimide film in which the polyamic acid is imidized by forming a film of a polyamic acid on a support and then performing heat treatment for about 1 to 8 hours while slowly raising the temperature at about 40 to 400° C., for example, in a temperature range of about 40 to 300° C.

The chemical imidization method is a method of promoting imidization by applying a dehydrating agent and/or an imidizing agent to the polyamic acid solution.

The composite imidization method is a method of obtaining a polyimide film by injecting a dehydrating agent and an imidizing agent into a polyamic acid solution to form a film on the support, heating the film at about 80 to 200° C., for example, at about 100 to 180° C. to activate the dehydrating agent and the imidizing agent, partially curing and drying the film, and then heating the partially cured and dried film at about 200 to 400° C. for about 5 to 400 seconds.

According to an embodiment, the imidization method of the present disclosure may be a chemical imidization method or a composite imidization method. Therefore, for example, the dehydrating agent and the imidizing agent may be additionally added to the polyamic acid solution in the step (b).

The dehydrating agent is one which promotes the ring closure reaction through the dehydration action on the polyamic acid, and examples of the dehydrating agent may include aliphatic acid anhydrides, aromatic acid anhydrides, N,N'-dialkylcarbodiimide, halogenated lower aliphatic anhydrides, halogenated lower fatty acid anhydrides, arylphosphonic acid dihalide, thionyl halide, etc., and these may be used alone or in mixtures of two or more thereof. From the viewpoints of acquisition easiness and cost, aliphatic acid anhydrides such as acetic anhydride, propionic anhydride, lactic anhydride, etc. among them may be used alone or in mixtures of two or more thereof.

The imidizing agent means a component having an effect of accelerating the ring closure reaction with respect to the polyamic acid, and for example, aliphatic tertiary amines, aromatic tertiary amines, heterocyclic tertiary amines, etc. are used. Among them, heterocyclic tertiary amines may be used from the viewpoint of reactivity as a catalyst. Examples of the imidizing agent may include quinoline, isoquinoline, β-picoline, pyridine, etc., and these may be used alone or in mixtures of two or more thereof.

The addition amounts of the dehydrating agent and the imidizing agent are not particularly limited, but the addition amount of the dehydrating agent may be about 0.5 to 5 moles, for example, about 0.5, about 1, about 1.5, about 2, about 2.5, about 3, about 3.5, about 4, about 4.5 or about 5 moles, and for another example, about 1.0 to 4 moles with respect to 1 mole of the amic acid group in the second polyamic acid, and the addition amount of the imidizing agent may be about 0.05 to 3 moles, for example about 0.05, about 0.1, about 0.2, about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9, about 2, about 2.1, about 2.2, about 2.3, about 2.4, about 2.5, about 2.6, about 2.7, about 2.8, about 2.9 or about 3 moles, and for another example, 0.2 to 2 moles with respect to 1 mole of the amic acid group in the second polyamic acid. In the above range, imidization may be sufficient and casting a film form may be easy.

In an embodiment, in the step (c) for forming a gel film, the gel film may be obtained by drying a precursor composition cast on a support (e.g., a glass plate, an aluminum foil, an endless stainless belt, a stainless drum, or the like) in a temperature range of about 40 to 300° C., for example, about 80 to 200° C., for another example, from about 100 to about 180° C., and for another example, about 100 to 130° C. Thereby, the dehydrating agent and the imidizing agent are activated, and curing and/or drying partially takes place so that the gel film may be formed. The gel film is at an intermediate stage of curing from a polyamic acid to polyimide, and may have self-supporting properties.

In some cases, a step of stretching the gel film in order to adjust the thickness and size of a polyimide film finally obtained and improve the orientation properties may be included, and stretching may be performed in at least one direction of the machine conveying direction (MD) and the transverse direction (TD) with respect to the machine conveying direction.

The volatile matter content of the gel film may be, although the present disclosure is not limited thereto, about 5 to 500% by weight, for example, about 5 to 200% by weight, and for another example, about 5 to 150% by weight. In the above range, there may be an effect of avoiding the occurrence of defects such as film breakage, tint stains, characteristic fluctuations, etc. in a subsequent process of performing heat treatment in order to obtain a polyimide film. Here, the volatile matter content of the gel film may be calculated using Equation 1 below, and in Equation 1, A indicates the weight of the gel film, and B indicates the weight after heating the gel film at 450° C. for 20 minutes.

$$(A-B) \times 100/B \qquad \text{<Equation 1>}$$

According to an embodiment, in the step (d), a solvent, etc. remaining on the gel film may be removed by heat-treating the gel film at a variable temperature range of about 50 to 700° C., for example, about 150 to 600° C., and for another example, about 200 to 600° C., and a polyimide film may be obtained by imidizing most of the remaining amic acid groups.

In some cases, the polyimide film may be further cured by heating and finishing the polyimide film obtained as above at a temperature of about 400 to 650° C. for about 5 to 400 seconds, and in order to relieve the internal stress that may also remain in the obtained polyimide film, this may also be performed under a certain tension.

According to another aspect, there is provided an electronic device including the above-described graphite sheet.

Hereinafter, the configuration and operation of the present disclosure will be described in more detail through preferred embodiments of the present disclosure. However, this is presented as a preferred example of the present disclosure, and it should not be construed as limiting the present disclosure in any sense.

EXAMPLE

Preparation Example 1

After adding 200 g of N,N'-dimethylacetamide (DMAc) to a 1 L container and lowering the temperature to 0° C., 17.23 g (84.4 mmol) of 4,4'-oxyphenylenediamine (ODA) was added thereto and dissolved. 18.4 g (84.4 mmol) of 1,2,4,5-benzenetetracarboxylic dianhydride (PMDA) was injected thereinto while being added dropwise. After stirring the mixture for 30 minutes while controlling the reaction temperature not to exceed 40° C., the temperature was slowly raised to 80° C. and then the mixture was stirred and aged at the same temperature for 4 hours to obtain a polyamic acid solution. The viscosity of the obtained polyamic acid solution was measured to be 75 poises, and the intrinsic viscosity was 1.31 dl/g. The obtained polyamic acid solution was immersed in 800 g of methanol, discharged in the form of a thread, and left alone for 10 hours.

Once every 3 hours, the methanol supernatant floating on the polyamic acid immersion in the form of a thread was removed, and 600 g of methanol was injected to remove the solvent. After 10 hours, all the methanol was drained and the remaining solidified material was pulverized using a pulverizer, washed and filtered with water and methanol, and then dried in a vacuum oven at 40° C. for 10 hours to obtain a powdery polyimide-based filler having an average particle diameter of 3 μm.

Preparation Example 2

A polyimide-based filler having an average particle diameter of 1 μm was obtained in the same manner as in Preparation Example 1 except that the viscosity of the polyamic acid solution was 30 poises.

Preparation Example 3

A polyimide-based filler having an average particle diameter of 10 μm was obtained in the same manner as in Preparation Example 1 except that the viscosity of the polyamic acid solution was 200 poises.

Preparation Example 4

After adding 200 g of N,N'-dimethylacetamide (DMAc) to a 1 L container and lowering the temperature to 0° C., 17.23 g (84.4 mmol) of 4,4'-oxyphenylenediamine (ODA) was added thereto and dissolved. 18.4 g (84.4 mmol) of 1,2,4,5-benzenetetracarboxylic dianhydride (PMDA) was injected thereinto while being added dropwise. After stirring the mixture for 30 minutes while controlling the reaction temperature not to exceed 40° C., the temperature was slowly raised to 80° C. and then the mixture was stirred and aged at the same temperature for 4 hours to obtain a polyamic acid solution.

0.97 g (3 parts by weight) of graphene having a plate-like structure, an average long diameter of 10 μm, and an average length with respect to the vertical direction of 2 nm was added and uniformly dispersed in the obtained polyamic acid solution.

Thereafter, the polyamic acid solution was immersed in 800 g of methanol, discharged in the form of a thread, and left alone for 10 hours. Once every 3 hours, the methanol supernatant floating on the polyamic acid immersion in the form of a thread was removed, and 600 g of methanol was injected to remove the solvent.

After 10 hours, all the methanol was drained and the remaining solidified material was pulverized using a pulverizer, washed and filtered with water and methanol, and then dried in a vacuum oven at 40° C. for 10 hours to prepare a graphene-containing polyimide-based filler having an average particle diameter of 3 μm.

Preparation Example 5

A graphene-containing polyimide-based filler having an average particle diameter of 1 μm was prepared in the same manner as in Preparation Example 5 except that the viscosity of the polyamic acid solution was 30 poises.

Preparation Example 6

A graphene-containing polyimide-based filler having an average particle diameter of 10 μm was prepared in the same manner as in Preparation Example 5 except that the viscosity of the polyamic acid solution was 200 poises.

Example 1

404.8 g of dimethylformamide (DMF) as an organic solvent was injected into a 0.5 L reactor under nitrogen atmosphere. A polyamic acid was polymerized by setting the temperature to 25° C., injecting 45.59 g of ODA as a diamine monomer, performing stirring for about 30 minutes to confirm that the monomer was dissolved, injecting 49.66 g of PMDA as a dianhydride monomer, and adjusting the final injection amount so that the viscosity was finally 200,000 to 250,000 centipoises. Thereafter, a precursor composition was obtained by injecting 0.26 g of dicalcium phosphate having an average particle diameter of 3 μm as an inorganic filler and 0.86 g of the polyimide-based filler of Preparation Example 1, and performing stirring for 1 hour while maintaining the temperature. When performing conversion for the comparison, the precursor composition comprises 0.3 parts by weight of the inorganic filler and 1 part by weight of the polyimide-based filler with respect to 100 parts by weight of the polyamic acid solid content.

After injecting 2.25 g of betapicoline (BP) as an imidizing agent, 16.73 g of acetic anhydride (AA) as a dehydrating agent, and 9.5 g of DMF and 3.2 g of NMP as catalysts into 70 g of the precursor composition, the materials were uniformly mixed to cast the mixture to a thickness of 350 μm on a SUS plate (100SA, Sandvik) using a doctor blade, and the cast mixture was dried in a temperature range of 100 to 200° C. Then, the film was peeled off from the SUS plate, fixed to a pin frame, and transferred to a high-temperature tenter. The film was heated from 200 to 600° C. in the high-temperature tenter, cooled at 25° C., and separated from the pin frame to obtain a polyimide film having a width×length of 20 cm×20 cm and a thickness of 50 μm.

The polyimide film was heated to 1,200° C. at a rate of 3° C./min under nitrogen gas using a high-temperature furnace capable of performing carbonization and maintained for about 2 hours (carbonization). Subsequently, the carbonized polyimide film was heated to 2,800° C. at a temperature raising rate of 5° C./min under argon gas using an ultra-high temperature furnace, maintained for 1 hour (graphitization), and then cooled to manufacture a graphite sheet having a thickness of 30 μm.

Example 2

A graphite sheet was manufactured in the same manner as in Example 1 except that the polyimide-based filler of Preparation Example 2 was used.

Example 3

A graphite sheet was manufactured in the same manner as in Example 1 except that the polyimide-based filler of Preparation Example 3 was used.

Example 4

A graphite sheet was manufactured in the same manner as in Example 1 except that the injection amount of the polyimide-based filler was changed so that the content of the polyimide-based filler was 0.1 parts by weight.

Example 5

A graphite sheet was manufactured in the same manner as in Example 1 except that the injection amount of the polyimide-based filler was changed so that the content of the polyimide-based filler was 5 parts by weight.

Example 6

A graphite sheet was manufactured in the same manner as in Example 1 except that the injection amount of the inorganic filler was changed so that the content of the inorganic filler was 0.5 parts by weight.

Example 7

A graphite sheet was manufactured in the same manner as in Example 1 except that barium sulfate having an average particle diameter of 3 μm was used instead of dicalcium phosphate as an inorganic filler, and the injection amount of barium sulfate was changed so that the content of the inorganic filler was 0.3 parts by weight.

Example 8

404.8 g of dimethylformamide (DMF) as an organic solvent was injected into a 0.5 L reactor under nitrogen atmosphere. A polyamic acid was polymerized by setting the temperature to 25° C., injecting 45.59 g of ODA as a diamine monomer, performing stirring for about 30 minutes to confirm that the monomer was dissolved, injecting 49.66 g of PMDA as a dianhydride monomer, and adjusting the final injection amount so that the viscosity was finally 100,000 to 150,000 centipoises. Thereafter, a precursor composition was obtained by injecting 0.26 g of dicalcium phosphate having an average particle diameter of 3 μm as an inorganic filler and 0.56 g of the polyimide-based filler of Preparation Example 4, and performing stirring for 1 hour while maintaining the temperature. When performing conversion for the comparison, the precursor composition comprises 0.3 parts by weight of the inorganic filler and 1 part by weight of the polyimide-based filler with respect to 100 parts by weight of the polyamic acid solid content.

After injecting 2.25 g of betapicoline (BP) as an imidizing agent, 16.73 g of acetic anhydride (AA) as a dehydrating agent, and 9.5 g of DMF and 3.2 g of NMP as catalysts into 70 g of the prepared precursor composition, the materials were uniformly mixed to cast the mixture to a thickness of 350 μm on a SUS plate (100SA, Sandvik) using a doctor blade, and the cast mixture was dried in a temperature range of 100 to 200° C. Then, the film was peeled off from the SUS plate, fixed to a pin frame, and transferred to a high-temperature tenter. The film was heated from 200° C. to 600° C. in the high-temperature tenter, cooled at 25° C., and separated from the pin frame to obtain a polyimide film having a width×length of 20 cm×20 cm and a thickness of 50 μm.

The polyimide film was heated to 1,200° C. at a rate of 3° C./min under nitrogen gas using a high-temperature furnace capable of performing carbonization and maintained for about 2 hours (carbonization). Subsequently, the carbonized polyimide film was heated to 2,800° C. at a temperature raising rate of 5° C./min under argon gas using an ultra-high temperature furnace, maintained for 1 hour (graphitization), and then cooled to manufacture a graphite sheet having a thickness of 30 μm.

Example 9

A graphite sheet was manufactured in the same manner as in Example 8 except that the polyimide-based filler of Preparation Example 5 was used.

Example 10

A graphite sheet was manufactured in the same manner as in Example 8 except that the polyimide-based filler of Preparation Example 6 was used.

Example 11

A graphite sheet was manufactured in the same manner as in Example 8 except that the injection amount of the polyimide-based filler was changed so that the content of the polyimide-based filler was 0.1 parts by weight.

Example 12

A graphite sheet was manufactured in the same manner as in Example 8 except that the injection amount of the polyimide-based filler was changed so that the content of the polyimide-based filler was 5 parts by weight.

Example 13

A graphite sheet was manufactured in the same manner as in Example 8 except that the injection amount of the inorganic filler was changed so that the content of the inorganic filler was 0.5 parts by weight.

Example 14

A graphite sheet was manufactured in the same manner as in Example 8 except that barium sulfate having an average particle diameter of 3 μm was used instead of dicalcium phosphate as an inorganic filler, and the injection amount of barium sulfate was changed so that the content of the inorganic filler was 0.3 parts by weight.

Comparative Example 1

A graphite sheet was manufactured in the same manner as in Example 1 except that the polyimide-based filler was not injected.

Comparative Example 2

A graphite sheet was manufactured in the same manner as in Example 8 except that the polyimide-based filler was not injected.

Evaluation Example 1

The number of surface defects per unit area (10 mm×10 mm) of the polyimide films manufactured in Examples and Comparative Examples were measured by the naked eyes, and the results are shown in Table 1.

Evaluation Example 2

The thermal diffusivities for the thickness direction and planar direction of the graphite sheets manufactured in Examples and Comparative Examples were measured by a laser flash method using diffusion rate measuring equipment (model name: LFA 467, NETZSCH), and the thermal conductivities were calculated by multiplying the measured thermal diffusivity values by density (weight/volume) and specific heat (specific heat measurement value using DSC).

Evaluation Example 3

The occurrence number of protrusions having a size of 0.05 mm or more per unit area (50 mm×50 mm) of the graphite sheets manufactured in Examples and Comparative Examples was measured by the naked eyes, and this is called the number of bright spots and shown in Table 1.

TABLE 1

|  | Polyimide film Surface defects (number) | Graphite sheet | | |
|---|---|---|---|---|
|  |  | Thermal conductivity in the planar direction (W/m · k) | Thermal conductivity in the thickness direction (W/m · k) | Bright spots (number) |
| Example 1 | 0 | 1127.3 | 33.2 | 2 |
| Example 2 | 0 | 1188.4 | 30.1 | 1 |
| Example 3 | 0 | 1058.9 | 34.0 | 5 |
| Example 4 | 0 | 1174.6 | 31.5 | 0 |
| Example 5 | 0 | 1043.5 | 34.9 | 3 |
| Example 6 | 0 | 1135.0 | 30.2 | 2 |
| Example 7 | 0 | 1048.1 | 30.5 | 4 |
| Example 8 | 0 | 1133.7 | 66.6 | 1 |
| Example 9 | 0 | 1195.6 | 68.8 | 2 |
| Example 10 | 0 | 1068.2 | 69.7 | 2 |
| Example 11 | 0 | 1181.1 | 68.1 | 3 |
| Example 12 | 0 | 1051.2 | 71.0 | 4 |
| Example 13 | 0 | 1144.7 | 66.6 | 1 |
| Example 14 | 0 | 1054.8 | 66.7 | 2 |
| Comparative Example 1 | 0 | 1142.2 | 5.4 | 3 |
| Comparative Example 2 | 0 | 1139.4 | 5.7 | 3 |

As can be confirmed from Table 1 above, it can be seen that the graphite sheets of Examples 1 to 14 of the present disclosure have excellent thermal conductivities in both the plane direction and the thickness direction, whereas the graphite sheets of Comparative Examples 1 and 2 have very low thermal conductivities in the thickness direction.

Simple modifications or changes of the present disclosure can be easily implemented by those of ordinary skill in the art, and all such modifications or changes should be construed as being included in the scope of the present disclosure.

What is claimed is:

1. A graphite sheet having a thermal conductivity with respect to the planar direction of about 1,043.5 W/m·K or more and a thermal conductivity with respect to the thickness direction of about 30 W/m·K or more,
wherein the graphite sheet has the number of bright spots of 5 or less.

2. The graphite sheet of claim 1, wherein the graphite sheet has a thickness of about 10 to 100 µm.

3. The graphite sheet of claim 1, wherein the graphite sheet is manufactured from a polyimide film, and the polyimide film has about 4 surface defects or less.

4. The graphite sheet of claim 1, wherein the graphite sheet is manufactured from a polyimide film, and the polyimide film comprises a spherical polyimide-based filler.

5. The graphite sheet of claim 4, wherein the polyimide-based filler includes a polyimide-based filler containing graphene.

6. The graphite sheet of claim 4, wherein the polyimide film has a structure in which at least a portion of the polyimide-based filler is dispersed between multilayer structures in which at least some of polyimide chains are oriented in the planar direction.

7. The graphite sheet of claim 6, wherein the graphite sheet manufactured from the polyimide film has a structure in which a crosslinking portion is connected between layers of a multilayer graphite structure, the multilayer graphite structure is formed by graphitizing at least a portion of the multilayer structures of the polyimide chains, and the crosslinking portion is formed by graphitizing at least a portion of the polyimide-based filler.

8. The graphite sheet of claim 4, wherein the polyimide-based filler includes a spherical polyimide-based filler with an average particle diameter of about 1 to 10 µm.

9. The graphite sheet of claim 4, wherein the polyimide film is manufactured from a polyamic acid, and the polyimide-based filler is contained in an amount of about 0.1 to 5 parts by weight with respect to 100 parts by weight of the polyamic acid.

10. The graphite sheet of claim 4, wherein the polyimide film further comprises an inorganic filler having sublimability.

11. An electronic device including the graphite sheet of claim 1.

* * * * *